United States Patent
Yago Vicente et al.

(10) Patent No.: US 11,069,122 B2
(45) Date of Patent: Jul. 20, 2021

(54) PHOTOREALISTIC THREE DIMENSIONAL TEXTURING USING CANONICAL VIEWS AND A TWO-STAGE APPROACH

(71) Applicant: A9.com, Inc., Palo Alto, CA (US)

(72) Inventors: Tomas Francisco Yago Vicente, East Palo Alto, CA (US); Radek Grzeszcsuk, Menlo Park, CA (US); Arnab Sanat Kumar Dhua, Mountain View, CA (US)

(73) Assignee: A9.com, Inc., Palo Alto, CA (US)

( * ) Notice: Subject to any disclaimer, the term of this patent is extended or adjusted under 35 U.S.C. 154(b) by 0 days.

(21) Appl. No.: 16/698,109

(22) Filed: Nov. 27, 2019

(65) Prior Publication Data

US 2020/0098162 A1 Mar. 26, 2020

Related U.S. Application Data

(63) Continuation of application No. 15/890,018, filed on Feb. 6, 2018, now Pat. No. 10,515,477.

(51) Int. Cl.
*G06T 15/04* (2011.01)
*G06T 15/20* (2011.01)
(Continued)

(52) U.S. Cl.
CPC ........... *G06T 15/04* (2013.01); *G06T 1/60* (2013.01); *G06T 15/205* (2013.01); *G06T 17/05* (2013.01); *G06T 17/20* (2013.01)

(58) Field of Classification Search
CPC .......... G06T 15/04; G06T 1/60; G06T 15/20; G06T 15/205; G06T 17/05; G06T 17/20;
(Continued)

(56) References Cited

U.S. PATENT DOCUMENTS

| 6,356,272 B1 | 3/2002 | Matsumoto |
| 6,518,963 B1 | 2/2003 | Waupotitsch |

(Continued)

FOREIGN PATENT DOCUMENTS

| EP | 1204073 | 5/2002 |
| WO | 2015127246 | 8/2015 |
| WO | 2019/156971 | 8/2019 |

OTHER PUBLICATIONS

C. Allene, J. Pons and R. Keriven, "Seamless image-based texture atlases using multi-band blending," 2008 19th International Conference on Pattern Recognition, Tampa, FL, USA, 2008, pp. 1-4, doi: 10.1109/ICPR.2008.4761913. (Year: 2008).*

(Continued)

*Primary Examiner* — Antonio A Caschera
(74) *Attorney, Agent, or Firm* — Hogan Lovells US LLP

(57) ABSTRACT

Images of various views of objects can be captured. An object mesh structure can be created based at least in part on the object images. The object mesh structure represents the three-dimensional shape of the object and includes a mesh with mesh elements. The mesh elements are assigned views first from a subset of views to texture large contiguous portions of the object from relatively few views. Portions that are not textured from the subset views are textured using the full set of views, such that all mesh elements are assigned views. The views first assigned from the subset of views and the views then assigned from the full plurality of views can be packaged into a texture atlas. These texture atlas views can be packaged with mapping data to map the texture atlas views to their corresponding mesh elements. The texture atlas and the object mesh structure can be sent to a client device to render a representation of the object. The representation can be manipulated on the client device in an augmented reality setting.

20 Claims, 12 Drawing Sheets

(51) Int. Cl.
*G06T 1/60* (2006.01)
*G06T 17/20* (2006.01)
*G06T 17/05* (2011.01)

(58) Field of Classification Search
CPC ........ G06T 2207/10028; H04N 13/282; H04N 13/279
See application file for complete search history.

(56) References Cited

U.S. PATENT DOCUMENTS

2002/0085748 A1    7/2002   Baumbera
2014/0184631 A1    7/2014   Unger et al.
2015/0381968 A1   12/2015   Arora

OTHER PUBLICATIONS

International Search Report and Written Opinion issued in co-related International Application No. PCT/US2019/016657 dated Jul. 26, 2019.
Non-Final Rejection issued in U.S. Appl. No. 15/890,018 dated Apr. 25, 2019.
Notice of Allowance and Fees Due issued in U.S. Appl. No. 15/890,018. dated Aug. 21, 2019.
Notice of Allowance and Fees Due issued in U.S. Appl. No. 15/890,018. dated Sep. 17, 2019.

* cited by examiner

PHOTOREALISTIC THREE DIMENSIONAL TEXTURING USING CANONICAL VIEWS AND A TWO-STAGE APPROACH

CROSS-REFERENCE TO RELATED APPLICATION

This Application claims priority to allowed Non-Provisional patent application Ser. No. 15/890,018 filed Feb. 6, 2018, titled "PHOTOREALISTIC THREE DIMENSIONAL TEXTURING USING CANONICAL VIEWS AND A TWO-STAGE APPROACH", which is hereby incorporated by reference herein in its entirety.

BACKGROUND

Users are increasingly purchasing items over the Internet. Accordingly, when a customer receives an item, it may be the first time he or she has viewed the item in person. The item may not look the same way the customer envisioned based on photographs viewed online. For example, a customer may order a lamp to place on an end table, but when the ordered lamp is physically placed on the table, the customer might not be pleased with its size or style, particularly relative to other items in the room. Providing a photorealistic rendering of the object may help with the ordering process. This may require providing a three-dimensional model to a mobile device in a small file size package.

BRIEF DESCRIPTION OF THE DRAWINGS

Various embodiments in accordance with the present disclosure will be described with reference to the drawings, in which.

DETAILED DESCRIPTION

Figure 1A:
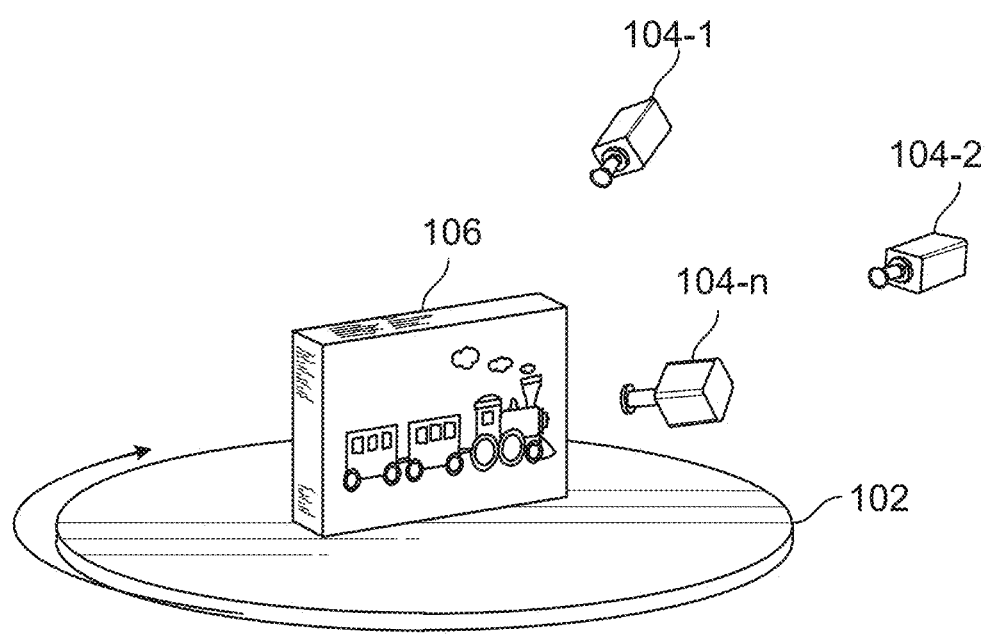
FIGS. 1A-B illustrate an example image capture system that can be utilized in accordance with various embodiments.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Approaches described and suggested herein relate to generating three-dimensional representations of objects. In embodiments, a plurality of images of an object are captured from a plurality of views. An object mesh structure representing the object can have a mesh with mesh elements. Each mesh element represents a portion of the object. That particular portion may be visible from multiple captured images. Therefore, it must be determined which of the multiple captured images to use to represent that particular portion of the object. That is, there may be multiple views that could be assigned to the same mesh element, with varying degrees of photorealism. A mesh element can be projected onto the object image associated with a specified view. The specified view is assigned to a mesh element by mapping that projection to the mesh element in the object mesh structure.

There are multiple ways to capture a plurality of images of an object. For example, an object can be placed on a rotatable platen viewable by cameras arranged in a fixed capture array. The cameras in the array can each capture an image at various platen positions. An object mesh structure can be created from the object images. The object mesh structure represents the three-dimensional shape of the object. In embodiments, the object mesh structure is created by first converting each object image into a segmentation mask indicating object pixels and non-object pixels. The object mesh structure can be created by carving away the two-dimensional non-object portions for each segmentation mask from a three-dimensional object environment. This leaves an object mesh structure depicting the three-dimensional shape of the object. It should be noted that other methods can also be used to create the object mesh structure.

In embodiments, the object mesh structure includes mesh elements, for example, polygons that make up the mesh structure. A mesh element is said to be textured when a view is assigned to it and untextured when no view is assigned. Each mesh element, which in embodiments can be triangles, can independently be assigned a view from the plurality of object images. That is, the object portion corresponding to a particular triangle in the object mesh network may be captured from a plurality of different viewpoints. It may be determined that certain viewpoints of that object portion, when assigned to the object mesh structure, result in a more photorealistic object than others. Photorealism may also be affected by the transition from one mesh element to the next. Therefore, in addition to considering individual mesh element assignments, photorealism may also be affected by considering the interplay between viewpoints assigned to neighboring mesh elements.

In embodiments, canonical views are determined such that a large number of triangles are assigned from the same view. By assigning large contiguous portions of the object from the same viewpoint it is ensured that photorealism is not lost with unnatural transitions in between mesh elements. A canonical view can be determined if it covers a threshold portion of the object or a threshold number of mesh elements. For example, planes can be fitted to the object mesh structure to determine main planes that will cover most of the object, and the canonical views can be selected as the views that best align with those planes.

The canonical views can be used to texture most of the object mesh structure. For example, it can be determined that a threshold portion of the object mesh structure will be textured with the canonical views. For instance, it can be determined that 70%, 75%, 80%, 85%, 90% or some other percentage of total mesh elements will be textured using the canonical set of views, and the remainder of the mesh elements will be textured considering all available views. That is, many mesh elements can first be textured using the reduced set of views before the rest of the mesh elements are textured using the full set of views. In embodiments, view assignments are determined based on minimizing an energy function that sums unary potentials and pairwise potentials. The unary potentials define the cost of assigning a view to a given mesh element. The pairwise potentials can define the cost of assigning two given views to two adjacent mesh elements.

A band of mesh elements can be left untextured around every canonical view. This band or seam separates the contiguous portions textured by individual canonical views. In embodiments, the untextured band is created by projecting the mesh elements into an image view and creating a structure mask. A set of structure masks can be created corresponding to the set of canonical views. A structure mask provides an estimate of the object's location in the image view. The structure mask can then be eroded, which makes it smaller. Pixel erosion removes pixels at the boundary, which are those pixels that are least likely to form part of the object. The mesh elements outside the structure mask are not necessarily assigned a view from the set of canonical views. In other words, the canonical views are not exclusively used to texture these mesh elements. The canonical views can be used to texture the mesh elements within the eroded masks. The untextured mesh elements can be textured after the canonical view stage. That is, texturing can occur in two stages. First, canonical views can be used to texture most of the image, leaving bands or seams separating the portions textured with canonical views. Then, all views can be used to texture the mesh elements in the bands. For example, the untextured mesh elements can be textured using the energy function described above, but in this instance considering all available views, not just the canonical views. The canonical views and all other assigned views can be packaged in a textured atlas, which also included information mapping the assigned views to their respective mesh elements. In embodiments, the views assigned from the canonical views and the views assigned from the full set of views are the only views making up the texture atlas views. The texture atlas and object mesh structure can be provided to a client device to view a three-dimensional model of the object.

Various other such functions can be used as well within the scope of the various embodiments as would be apparent to one of ordinary skill in the art in light of the teachings and suggestions contained herein.

As described, various embodiments provide for the creation and rendering of three-dimensional object representations. An image capture system to obtain images of objects is illustrated in FIG. 1A. In the example shown in FIG. 1A, an image capture array 100 captures a number of images of an object. The image capture array 100 includes a number of cameras 104-1, 104-2, . . . 104-n or other image capture devices, which are positioned about a platen 102. The image capture devices can include RGB cameras, infrared sensors, and/or other devices. In embodiments, the illustrative cameras 104-1, 104-2, . . . 104-n capture images of the platen 102 and background without an object present, such that there is a background image associated with each viewpoint. An object 106 to be rendered is positioned on the platen 102. The cameras 104-1, 104-2, . . . 104-n capture images of the object 106, the platen rotates, and additional images are captured from different viewpoints. In embodiments, the cameras 104-1, 104-2, . . . 104-n are longitudinally aligned but are placed at different latitudes. In other words, the cameras 104-1, 104-2, . . . 104-n are aligned along the same vertical axis but at different heights.

Figure 1B:
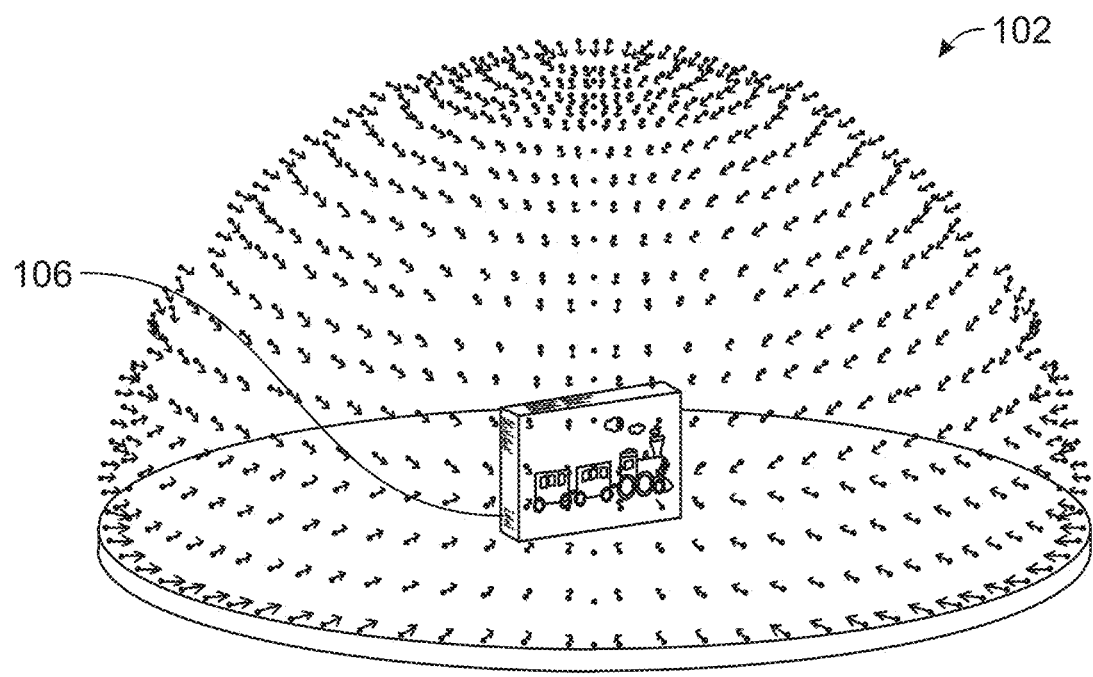

The number of rotations and the number of cameras 104-1, 104-2, . . . 104-n can vary. For example, in embodiments, 19 cameras and 72 rotations can be used. This results in 1,368 object images, one per camera per platen position. As noted, however, these numbers can be varied. As illustrated in FIG. 1B, this results in capturing object images from a number of different viewpoints in a hemisphere 102 about the object 106. The "density" of this viewpoint hemisphere 102, or total number of viewpoints contained, depends on the number of image capture devices used and the number of platen positions at which images are captured. In embodiments, a fiducial object—an object of known dimensions—can be placed next to the object 106. In embodiments, the fiducial object can be used to estimate a scaling factor, which can be used to determine the three-dimensional representation of the object 106.

When an image is captured, pose information can be recorded as well. The pose information indicates the angle at which a particular image was captured. To record pose information, a coordinate system can be anchored on the object. That is, the origin of a three-dimensional coordinate system can be located on the object. The angle information recorded for an object image indicates (i) where the capturing camera was located in the coordinate system, and (ii) how the capturing camera was oriented with respect to the object. The rays representing the various viewpoints in FIG. 1B provide an example illustration of poses, with each point representing a camera location and each arrow representing a camera orientation. Each component of the pose—the camera location and the camera orientation—can be represented by three degrees within the coordinate system, such that each pose is defined by six degrees. Three degrees provide the camera location and another three degrees indicate the direction in which the camera was pointing during image capture. Camera intrinsics can also be recorded. This information can include the focal lengths and principal point for each camera. The camera intrinsics can also be used during rendering.

Figure 2:
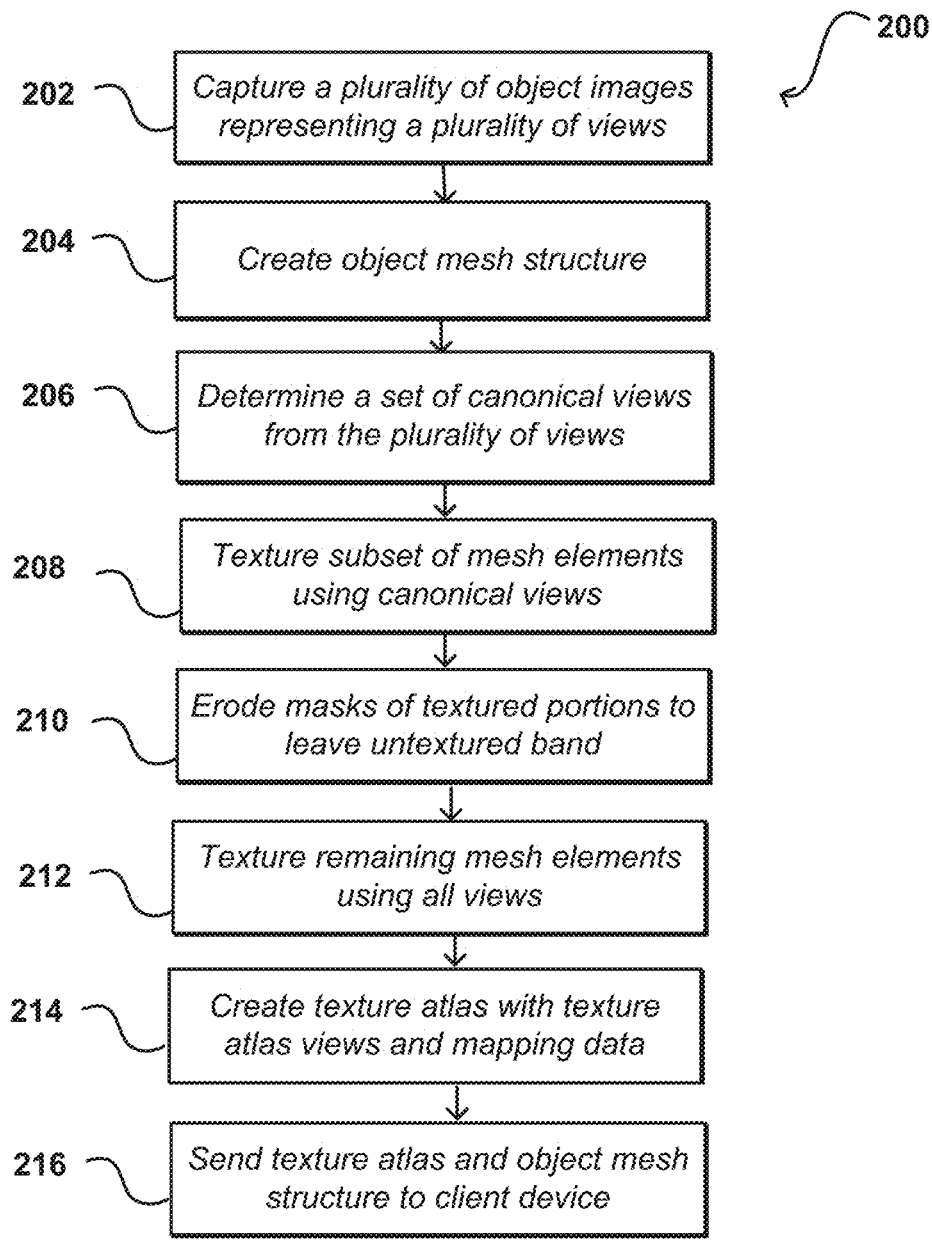
FIG. 2 illustrates an example method that can be utilized in accordance with various embodiments.

FIG. 2 describes an example method 200 for creating an three-dimensional object representation. As described above, embodiments include capturing a plurality of object images representing a plurality of views of the object 202. For example, the camera array and platen settings described above can result in 1,368 views because the 1,368 object images captured each represents a different view of the object. An object mesh structure can be created using the object images 204. In embodiments, each object image is converted into a segmentation mask. A segmentation masks includes pixels belonging to the object and pixels not belonging to the object, for example represented as white and black pixels respectively in the segmentation mask. Each mask can be thought of as indicating the area occupied by the object for the particular two-dimensional view shown. Collectively, the segmentation masks can be used to generate an object mesh structure. In embodiments, this is done by determining a three-dimensional object environment and subtracting the non-object area from each segmentation mask from that object environment. In other words, the two-dimensional non-object area is carved away from a three-dimensional object environment for each view, which leaves a three-dimensional representation of the object.

A set of canonical views is then determined 206. The canonical views are a subset of the overall views that are captured. In embodiments, between three and eight canonical views are determined. In embodiments, five canonical views are determined, those corresponding to the front, right, back, left, and top of the object. As noted above, the total number of views can number in the dozens, hundreds, thousands, or any higher order quantity. For example, the viewpoint hemisphere described above includes 1,368 views. In embodiments, five of these views can be selected as canonical views. This allows large contiguous portions of the object to be textured first with a relatively small subset of views. That is, at the first texturing pass, five canonical views can be used for texturing large portions of the object, even if there are, for instance, 1,368 views available. For example, the canonical views can represent a subset of less than one percent of the total available views, but these canonical views can be used to texture, for instance, greater than 90% of the total mesh elements.

The canonical views can be selected so that they together cover large portions of the object. For example, canonical views can be used to texture at least 70% of the total mesh elements, at least 75% of the total mesh elements, at least 80% of the total mesh elements, at least 85% of the total mesh elements, at least 90% of the total mesh elements, or any other threshold. In embodiments, the canonical views are captured at a higher resolution than other views. Because the canonical views are used disproportionally for texturing, the higher resolution for these specific object images can disproportionally impact the overall photorealism of the rendered three-dimensional model.

As described above, there are multiple ways to determine canonical views. One manner of determining canonical views is to fit planes to the object mesh structure to determine which planes cover large portions of the object. A plane can be determined to correspond to a canonical view if it covers a threshold portion of the object mesh structure, for instance if it covers a certain percentage of the mesh elements (e.g. triangles) that make up the object mesh structure. In embodiments, the canonical views can be preset. For example, the canonical views can correspond to the front, left, back, right, and top views of an object. The image capture process described above can facilitate this because the canonical views can be matched to images captured by specific cameras at specific platen positions. Therefore, the canonical views can be defined before capturing the plurality of images.

The canonical views can then be used to texture a subset of the mesh elements 208. Texturing, as used herein, refers to the assignment of a view from the plurality of views to an object mesh element. A view is said to be assigned to a mesh element by projecting the mesh element onto the object image associated with the view. The portion of the image within the projection is then mapped to the mesh element. For example, a given triangle from an object mesh structure will likely correspond to a portion of the object that is visible in many different object images. Therefore, it must be determined which object image will be used to represent that portion of the object in the rendered object representation. That is, some views, when assigned to a given triangle, result in a more photorealistic representation than other views. In addition, it must be determined whether the transition from one triangle to the next appears photorealistic. For instance, it may be the case that two adjacent triangles are assigned two different views because each view independently was determined to result in a photorealistic representation for its respective triangle. However, it may be the case that the views do not appear photorealistic adjacent to one another, whether because of different illumination artifacts or other reasons. Therefore, it must also be considered whether adjacent pairs of triangles have been assigned views that optimize photorealism.

In embodiments, the following function can be used to optimize photorealism:

$$E(l) = \sum_{F_i \in Faces} E_{data}(F_i, l_i) + \sum_{(F_i, F_j) \in Edges} E_{smooth}(F_i, F_j, l_i, l_j) \quad \text{Equation 1}$$

The first component of the function relates to individual view assignments. $E_{data}(F_i, l_i)$ defines the cost of assigning view $l_i$ to mesh element $F_i$. In embodiments, the cost is inversely proportional to the quality of the texturing result obtained by projecting mesh element (e.g. triangle) $F_i$ onto the object image captured in view $l_i$. The quality can be measured as the product of the pixel area of the projection and the cosine of the viewing angle. As noted above, the pose information is captured for each object image. Therefore, it can be determined how direct of a viewing angle a certain view is associated with. If the viewing angle is 0°, meaning a perfectly aligned viewing angle, then the cosine of the viewing angle is one, which is associated with higher photorealism. If the viewing angle is off center, then the cosine of the viewing angle is less than one, which is associated with a lower quality assignment. In embodiments, the viewing angle is not considered, and only the projection area should be considered. For instance, if the mesh geometry is not accurate or pose information is not captured, then the projection area alone can be considered for measuring the unary potentials.

The second component of the function relates to pairwise view assignments. The pairwise potentials $E_{smooth}(F_i, F_j, l_i, l_j)$ define the cost of assigning views $l_i$ and $l_j$ respectively to triangles $F_i$ and $F_j$. This cost is inversely proportional to the smoothness of the transition between the two triangles. As will be discussed in additional detail with respect to FIG. 6, the smoothness of the transition is based at least in part on the common side between the triangles. This common side may appear to have a different color depending on the view at which it is captured. In order to compare the two views of the same edge, the shared edge is sampled with the same number of pixels for each view. That is, the length can be divided into an equal number of pixels. This results in two vectors of the same length, which can then be compared. The color of the shared edge can be determined by bilinear interpolation between the two edges from the two views.

This process can occur using only the canonical views as inputs, thus texturing portions of the object 208. Structure masks of the textured portions can be computed and then eroded to leave a band of untextured triangles around the textured portions 210. The bands separate contiguous portions of the object mesh structure textured by individual canonical views. Eroding the masks effectively makes them smaller, which leaves a band around them. The mesh elements in the untextured bands are then textured, or assigned views 212. The views can be assigned as described above, except this time considering all views, not just the canonical views. In embodiments, the result of this process is to have a view assigned for each object mesh element. A texture atlas can be created with these assigned views 214. The texture atlas includes the views and the mappings to their respective mesh elements. The texture atlas and object mesh structure can be sent to a client device 216 for rendering.

Figure 3:
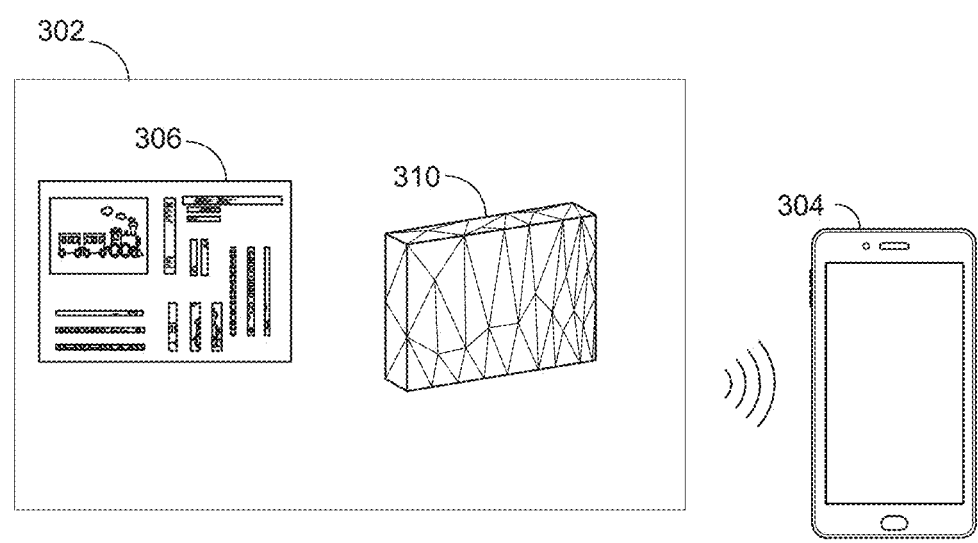
FIG. 3 illustrates an example package that can be sent to a client device in accordance with various embodiments.

For example, as illustrated in FIG. 3, the components described above can be sent to a client device 304. The client device package 302 can include the texture atlas 306, object mesh structure 310, and metadata. The metadata can include pose information and camera intrinsics as described above. The texture atlas 306 comprises all of the views assigned from the canonical views, all the views assigned from the full plurality of views, and the mapping information indicating which mesh element of the object mesh structure 310 the texture atlas views are assigned to. For example, the texture atlas 306 can include the canonical views to cover major portions of the object mesh structure 310 as well as all other views needed to fully texture the object mesh structure 310. In other words, the texture atlas will also include the views assigned to the bands not textured with the canonical views.

Figure 4A:
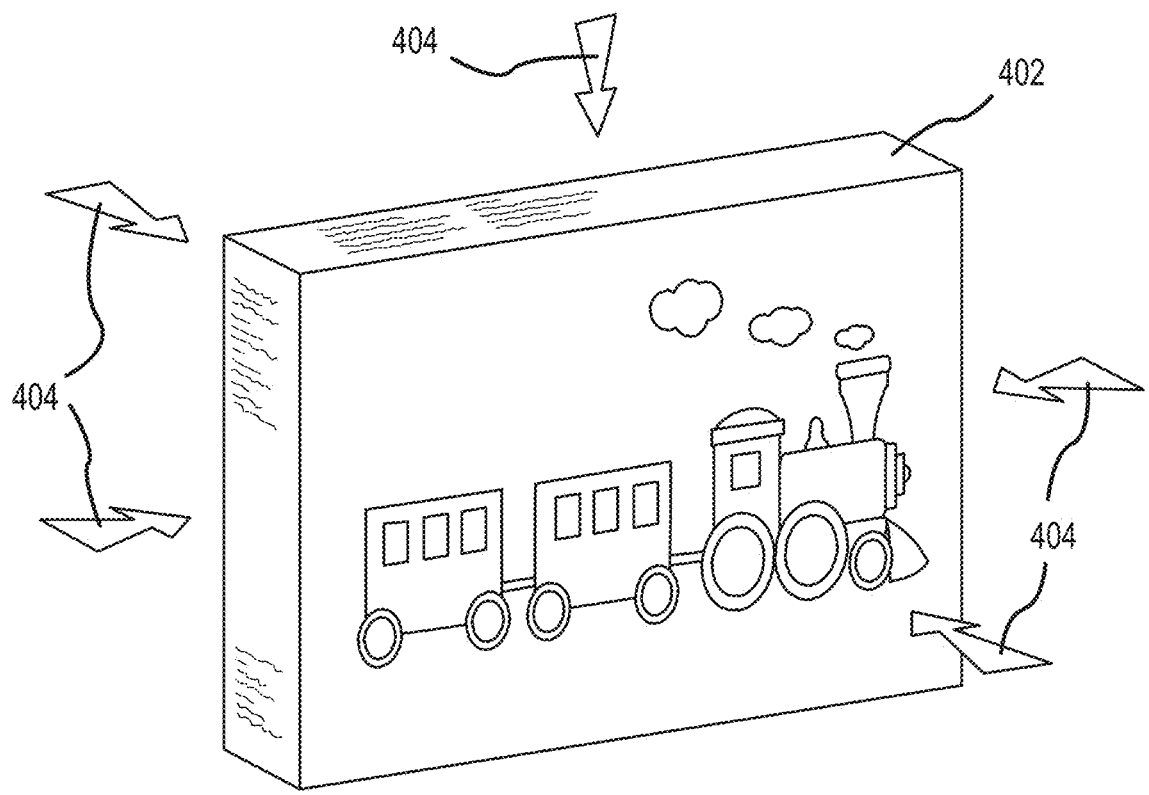
FIGS. 4A-B illustrate an example object and object mesh structure in accordance with various embodiments.
Figure 4B:
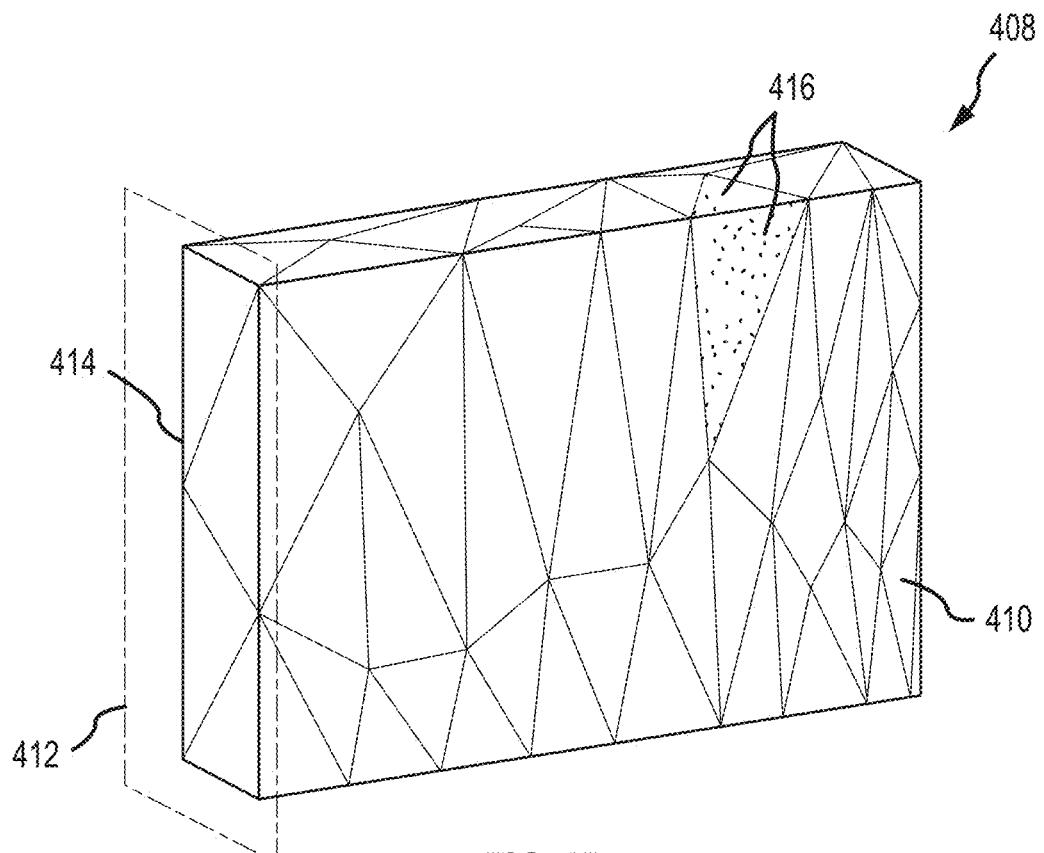

As described above, a three-dimensional object mesh structure can be created to represent the three-dimensional shape of an object. FIGS. 4A-B illustrate an example of an object 402 and its associated object mesh structure. In embodiments, the object 402 can be placed on a rotatable platen such as that described with respect to FIG. 1. Other methods can be used to capture the object images as well. For example, multiple object images can be manually captured by a camera operator. In embodiments, a camera array can be movable about a stationary object. Other methods can also be used to capture object images from multiple viewing angles. This results in a plurality of object images representing different views of the object 402. In FIG. 4A, canonical views 404 are illustrated as aligned with the front, right, back, left, and top of the object. These canonical views 404 can be preset in such a manner according to embodiments. For example, the object 402 can be placed on a rotatable platen, and it can be preset that the initial view corresponds to the front of the object 402 and a certain object image captured at that platen position will be designated as a canonical view. Then, after the platen has rotated 90°, it can be preset that one of the cameras (e.g. a camera vertically aligned with the center of the object 402) corresponds to an object image representing another canonical view. The remaining canonical views 404 can be designated in the same manner.

In embodiments, the canonical views 404 are not necessarily preset. For example, as illustrated in FIG. 4B, planes can be fit to the object mesh structure 408 to determine which planes cover major portions of the object mesh structure. For instance, a plane 412 is illustrated as aligning with the left side 414 of the object mesh structure 408. If it is determined that the plane 412 covers a threshold amount of the object, then the view corresponding to that plane 412 can be designated as a canonical view. Because the pose information for each view is captured, then one manner of selecting a canonical view is to select the view that most closely aligns with the normal of a plane 412 that covers a threshold portion of the object.

The object mesh structure 408 represents the three-dimensional shape of the object 402. Its surface includes a mesh composed of mesh elements, such as mesh element 410. For purposes of fitting the object mesh structure to Equation 1, the mesh can be thought of as a graph with nodes corresponding to mesh elements and graph edges between nodes corresponding to triangles that share a side in the object mesh structure. The mesh element 410 in FIG. 4B is a triangle. In embodiments, other polygons are used as mesh elements to form the mesh of the object mesh structure 408. In embodiments, the mesh elements comprise other shapes and may comprise more than one type of shape within the same object mesh structure. Adjacent mesh elements 416, such as the two shaded triangles can a common side or seam. Mesh elements can be adjacent to one another even if they are not on the same surface of the object mesh structure 408. For example, the adjacent mesh elements 416 shaded in FIG. 4B are located on the top and front of the object mesh structure.

Figure 5:
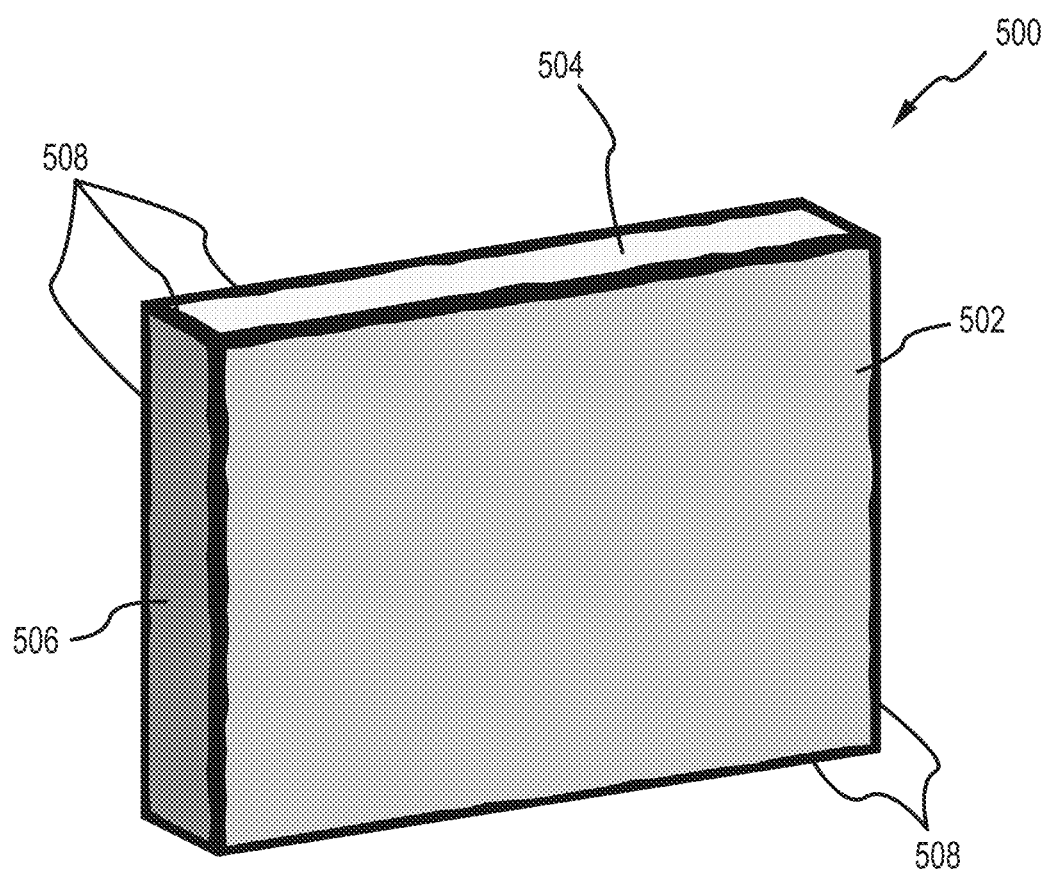
FIG. 5 illustrates an example of a partially textured object mesh structure in accordance with various embodiments.

As described above, in embodiments the object mesh structure is first textured using the canonical views. As illustrated in FIG. 5, this can result in large portions of the object mesh structure 500 being textured. For example, a canonical view corresponding to the front of the object can be used to texture most of the front 502 of the object, a canonical view corresponding to the top of the object can be used to texture most of the top 504 of the object, a canonical view corresponding to the left side of the object can be used to texture most of the left side 506 of the object, and so on until most of the object is textured. In embodiments, this texturing is performed by minimizing the value of Equation 1, but using only the canonical views, not all the views.

After the canonical view stage, the remaining as-yet untextured mesh elements can be textured, for example by applying Equation 1, but now using all views. In embodiments, it can be ensured that a band of untextured mesh elements remains around each portion textured with the canonical views. For example, a structure mask can be computed by projecting the mesh elements into an object image associated with a particular view. A structure mask provides an estimate of the object's location within the object image. The object can be described using various coordinate systems. For example, a two-dimensional coordinate system can be associated with each object image. Three-dimensional coordinate systems can also describe the object in three dimensions. For example, a physical coordinate system can be anchored to the object, a reference marker, the center of the platen, or elsewhere. For example, the coordinate system described with respect to recording pose information can also be used to describe the object in three dimensions.

As described above, a mask of the object can be eroded. Eroding the mask makes it smaller by effectively removing pixels at the boundary of the object. This in turn increases the likelihood that the mask covers pixels associated with the object. The smaller mask can then be used to determine valid pixels within the object image from the particular view i.e. it can be determined which portion of the object mesh structure needs to be textured. Then, the untextured bands 508 around the portions textured with the canonical views can be textured by minimizing the unary potentials and pairwise potentials for the untextured mesh elements and all available views.

Figure 6:
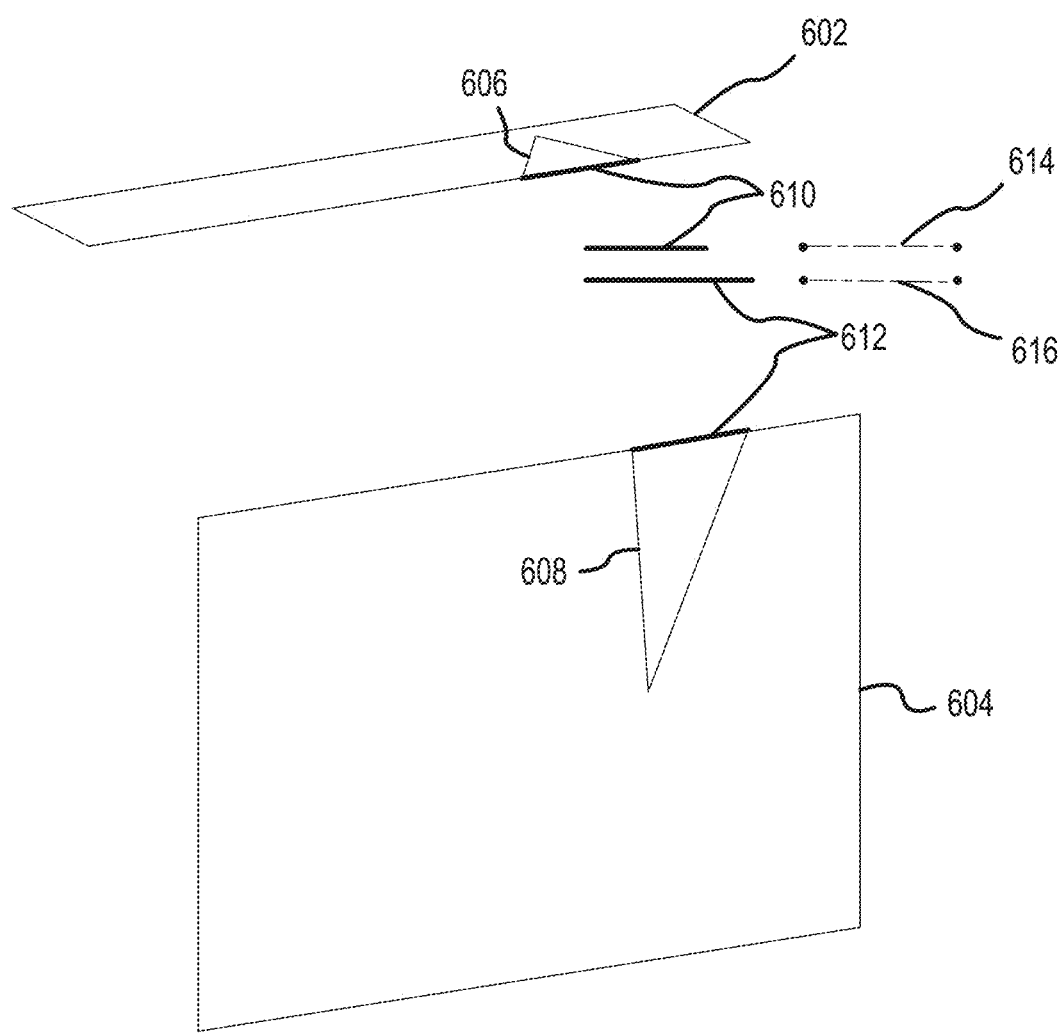
FIG. 6 illustrates an example approach for texturing an object mesh structure in accordance with various embodiments.

As described above, in addition to considering the photorealism of individual assignments, embodiments include the consideration of pairwise assignments. That is, photorealism can be affected if adjacent triangles in the mesh structure are assigned views that, while appropriate for those individual triangles, appear inconsistent when paired. For instance, inconsistent illumination across two adjacent triangles can result in a lack of photorealism. Therefore, pairwise potentials are minimized. Pairwise potentials define the cost of assigning two views to two adjacent mesh elements. For example, as illustrated in FIG. 6, views will be assigned to two adjacent triangles 606, 608. As discussed above, the triangles 606, 608 are defined as adjacent because they have a common side 610, 612 in the three dimensional object mesh structure. In this case, triangle 606 is part of the top 602 of the object and triangle 608 is part of the front 604 of the object, but the triangles 606, 608 are considered adjacent because of the common side 610, 612. In this example, triangles 606 and 608 are part of the band untextured using the canonical views. That is, it being understood that FIG. 6 is not necessarily drawn to scale, the triangles 606, 608 are part of the band around the portions textured with the canonical views, which are labeled as 508 in FIG. 5.

The common side 610, 612 can be used to determine the quality of the texturing result. As illustrated in FIG. 6, the side between the two triangles may appear to have different lengths depending on the viewing angle. For example, edge 612 of triangle 608 appears longer than the the same edge 610 appears as part of triangle 606, notwithstanding that the two edges are actually the same shared edge 610, 612 in three dimensions. This may be caused, for example, by a higher viewing angle for the view of the front 604. Therefore, while edge 610 and edge 612 in fact correspond to the same edge 610, 612, they can appear to be different lengths based on the views from which those edges are measured.

To compare the different views of the common edge 610, 612, the edges are sampled uniformly. That is, the edges are converted into pixel strips 614, 616 containing the same number of pixels. This results in two vectors of the same length, as measured in pixels, which can then be compared. For example, two edges may have 40 and 80 pixels. The two edges can be normalized to 20 pixels, so that two pixels strips, each containing 20 pixels are then compared. It is also possible to normalize, for example to 60 pixels, in which case sub-pixels would be sampled in the first strip to allow for a pixel strip of 60 pixels. The result is to have two pixel strips of the same length, so that the normalized pixel strips can be compared. Bilinear interpolation can be used to determine the color of the shared edge. For example, on a pixel by pixel basis, pixels in the shared edge can be assigned the intermediate color between the two colors of the corresponding pixels in the two normalized pixel strips.

Figure 7:
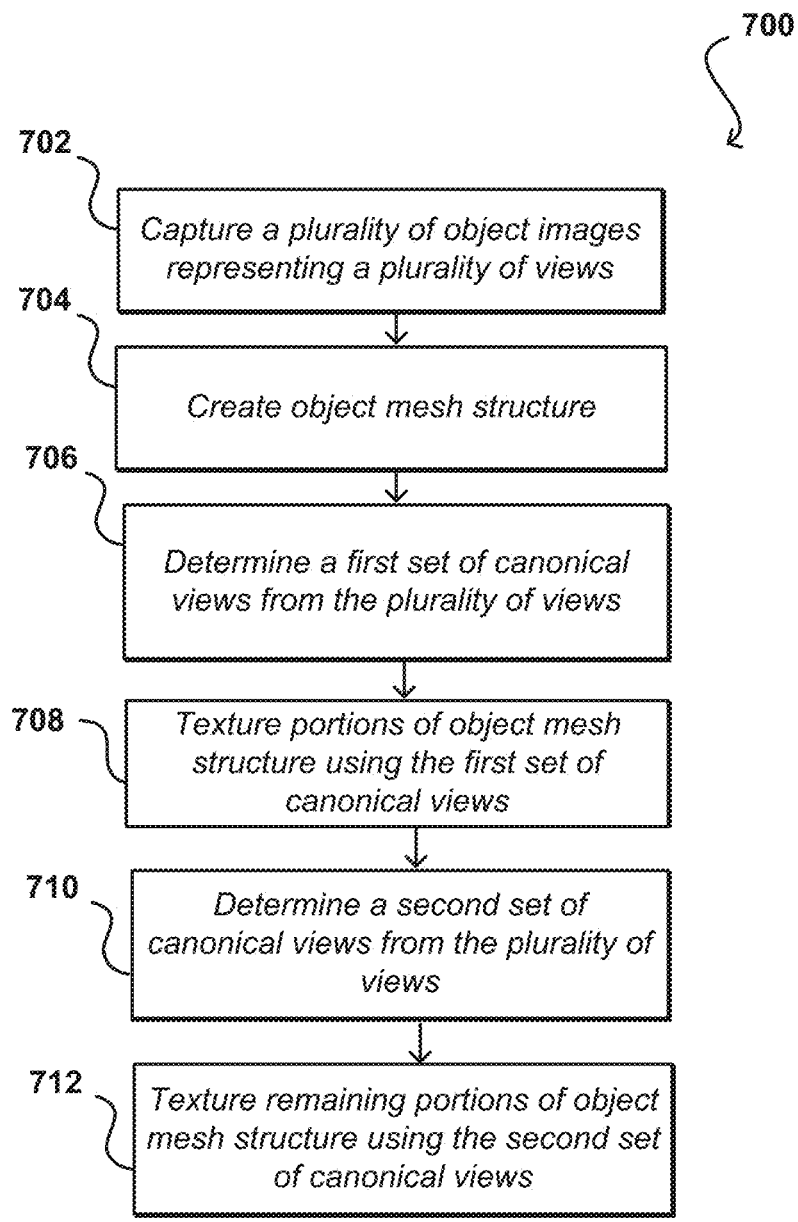
FIG. 7 illustrates an example method that can be utilized in accordance with various embodiments.

As illustrated in FIG. 7, methods 700 can include the use of more than one set of canonical views. For example, as described above, a plurality of object images representing a plurality of 30 views can be captured 702. An object mesh structure can be created 704, and a first set of canonical views can be determined from the plurality of views 706. As discussed above, the first set of canonical views can be used to texture portions of the object mesh structure 708. The first set of canonical views can be preset or algorithmically determined based on determining planes that cover major portions of the object. In various embodiments, the remaining as-yet untextured mesh elements can be textured based on all of the available views. However, in embodiments, a second set of canonical views can be determined 710. These views can also be preset in embodiments. For instance, the first set of canonical views can be preset to represent the front, right, back, left, and top of an object. Then, the second set of canonical views can be preset, for example, to represent the front-right, back-right, back-left, and front-left of the object. In other 10 words, the second set of canonical views can be preset to be offset from the first set of canonical views. In embodiments, the second set of canonical views can also be determined based on determining where large untextured mesh elements remain by, for example, fitting planes to the untextured portions. The second set of canonical views can then be used to texture remaining portions of the object mesh structure. 712.

Figure 8:
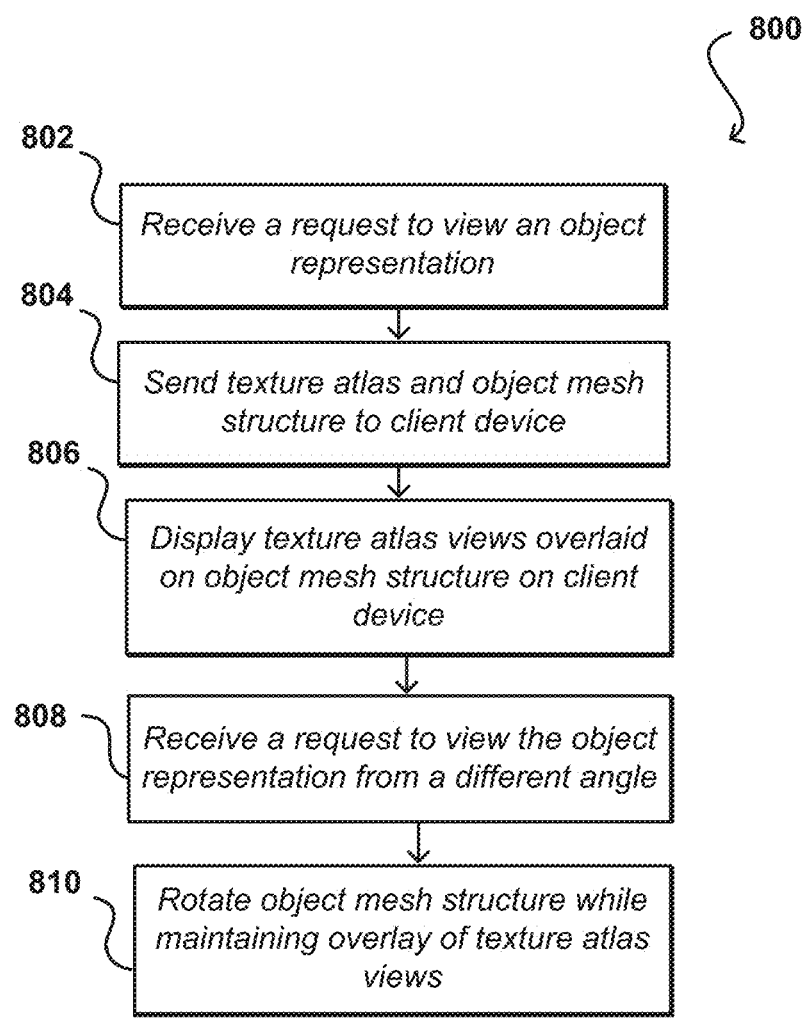
FIG. 8 illustrates an example method that can be utilized in accordance with various embodiments.

FIG. 8 illustrates a method 800 that can be used, for example, in an augmented reality context. Such a method can include receiving a request to view an object representation 802. For instance, a user of an electronic marketplace can make a request to view an object that the user is considering purchasing. The texture atlas and object mesh structure as described above can be sent to a client device of the user 804. As noted above, the texture atlas includes information mapping the texture atlas views to particular mesh elements. For example, the texture atlas includes a view for every mesh triangle as well as data properly mapping the texture atlas view to its mesh triangle. On the client device, the texture atlas views can be displayed overlaying the object mesh structure 806. In embodiments, the user can manipulate the object mesh structure. For example, the user may desire to view a particular object from a different angle. Accordingly, methods can include receiving a request to view the object representation from a different angle 808. The object mesh structure can then be rotated while maintaining the overlay of the texture atlas views 810.

Figure 9:
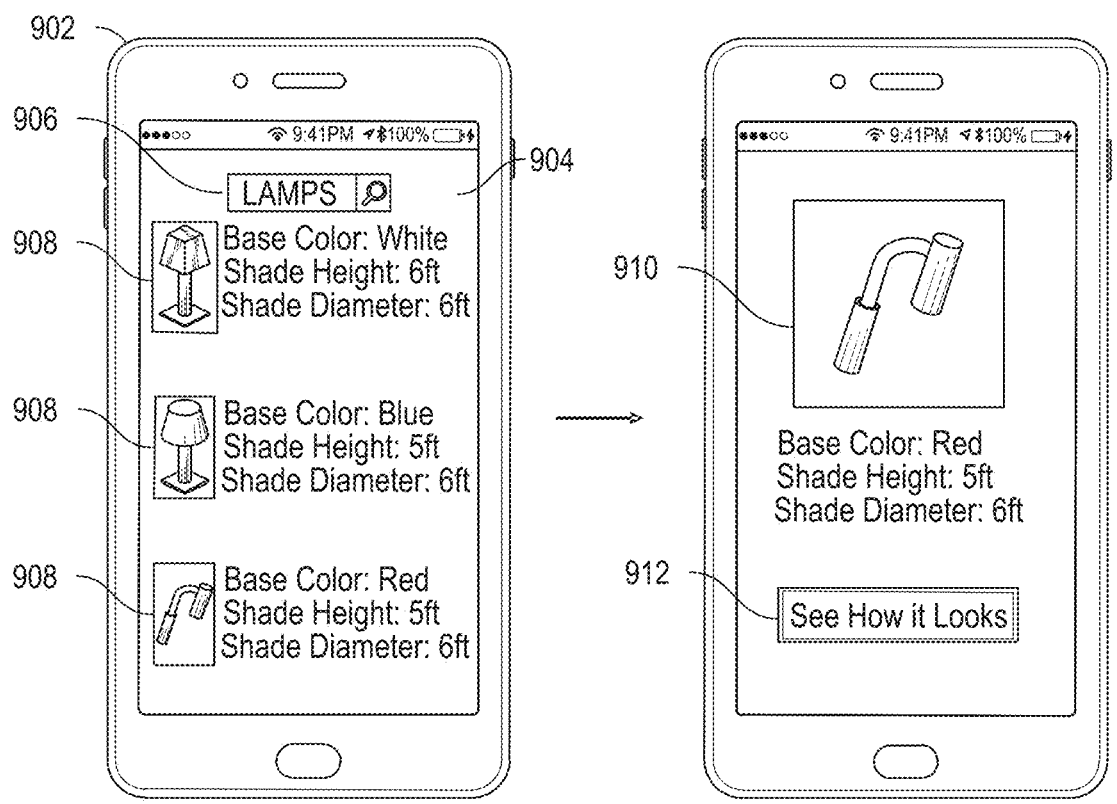
FIGS. 9A-B illustrate an example user interface that can be utilized in accordance with various embodiments.

FIGS. 9A-B illustrate an example user interface 904 that can be used to implement various embodiments. Embodiments can be implemented in the context of an electronic marketplace. The electronic marketplace can offer various items for sale to users who access the electronic marketplace, for example through a dedicated application. The application 904 can run on a mobile device 902 or other computing system. Embodiments can receive input of search parameters through a search field 906. FIGS. 9A-B illustrates a particular example in which the user searches for lamps. Other items offered by the electronic marketplace can be searched for as well. When a user searches "Lamps," for example, various lamps 908 can be presented to the user. FIG. 9B illustrates an example user interface that can be displayed in response to an item selection. The user can be shown a page with additional details about the user's selected lamp 910. A "See How It Looks" selection 912 or similar prompt can be presented to a user. When selected, the user can interact with a rendering of the selected lamp 910. In embodiments, the "See How It Looks" selection 912 or similar prompt activates an augmented reality environment to view and interact with the desired object in the context of a user's physical environment. The object mesh structure and texture atlas can be provided to the client device accordingly. It may be desirable for the user to interact with a photorealistic representation of the selected object, particularly in the context of the actual physical environment.

Figure 10:
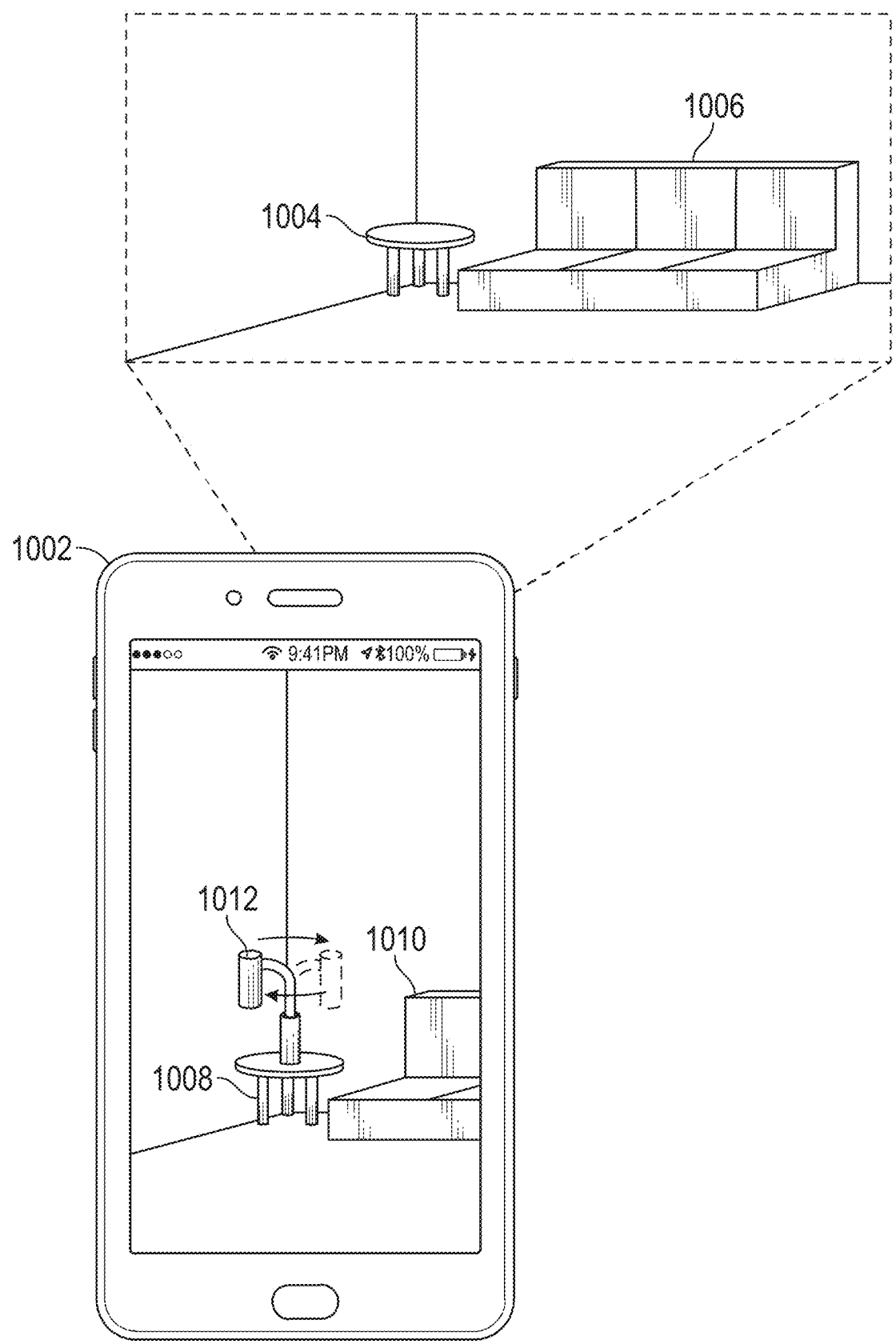
FIG. 10 illustrates an example user interface that can be utilized in accordance with various embodiments.

FIG. 10 illustrates an example of a user interacting with a selected item through an augmented reality setting. Continuing the above example, the selected lamp 1010 can be viewed in a user's home so she can get a sense of how the lamp would actually look where she had planned to place it. For example, a user may plan to place the selected lamp 1010 in her living room on an end table 1004 next to her couch 1006. The user can point the camera of her mobile device 1002 at the end table 1004. Through the mobile device's display, the user can view a representation of the lamp 1012 placed on top of the end table 1008. When viewing the representation of the lamp 1012 through her mobile device's display, the user can compare it to the color of the couch 1010 or the height of the end table 1008 to name two examples. The user can also rotate the representation of the lamp 1012 or move it around on the end table. This way, the user can understand how various items would look in her apartment before purchasing them. The lamp 1012 can be represented in three dimensions by the object mesh structure described above. The object mesh structure is overlaid by the appropriate views mapped from the texture atlas. Therefore, the user views a three-dimensional structure where each portion of the structure is overlaid by a projection of an actual image of the structure.

Figure 11:
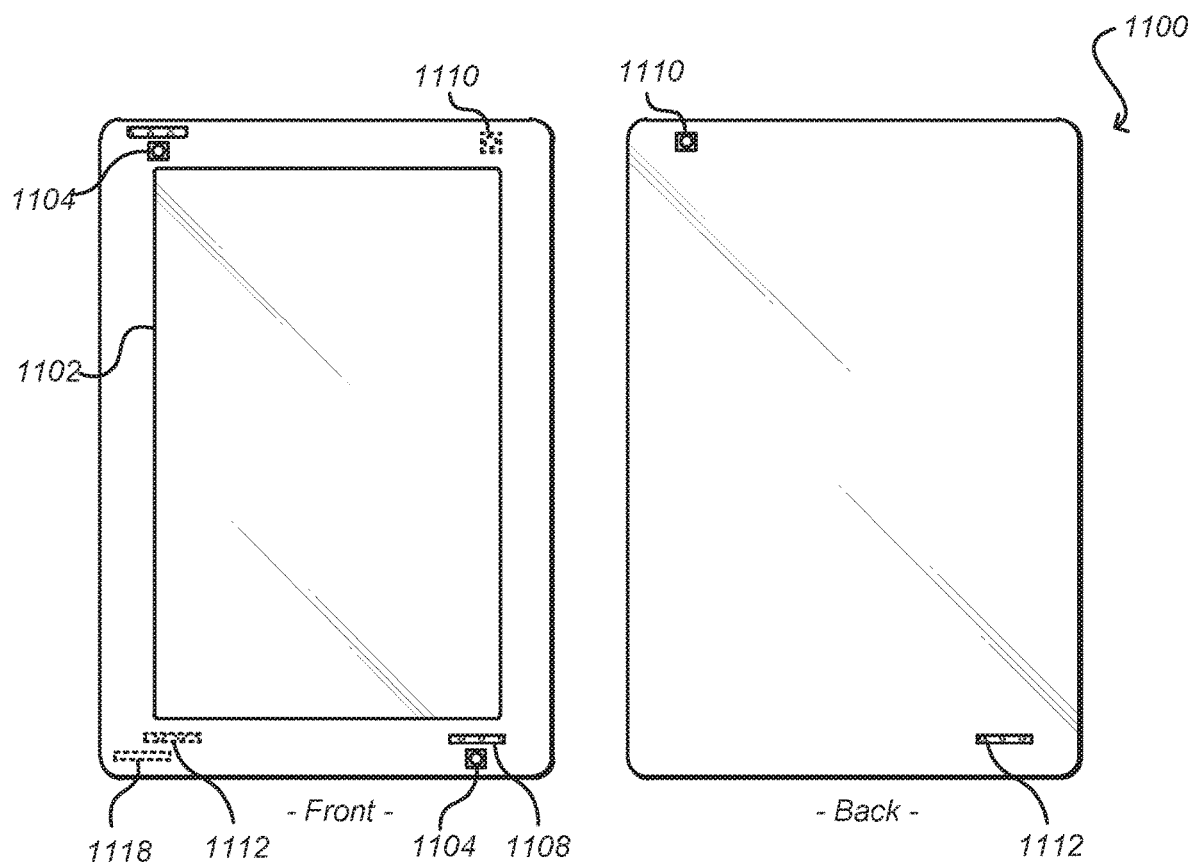
FIG. 11 illustrates an example computing device that can be used in accordance with various embodiments.
Figure 12:
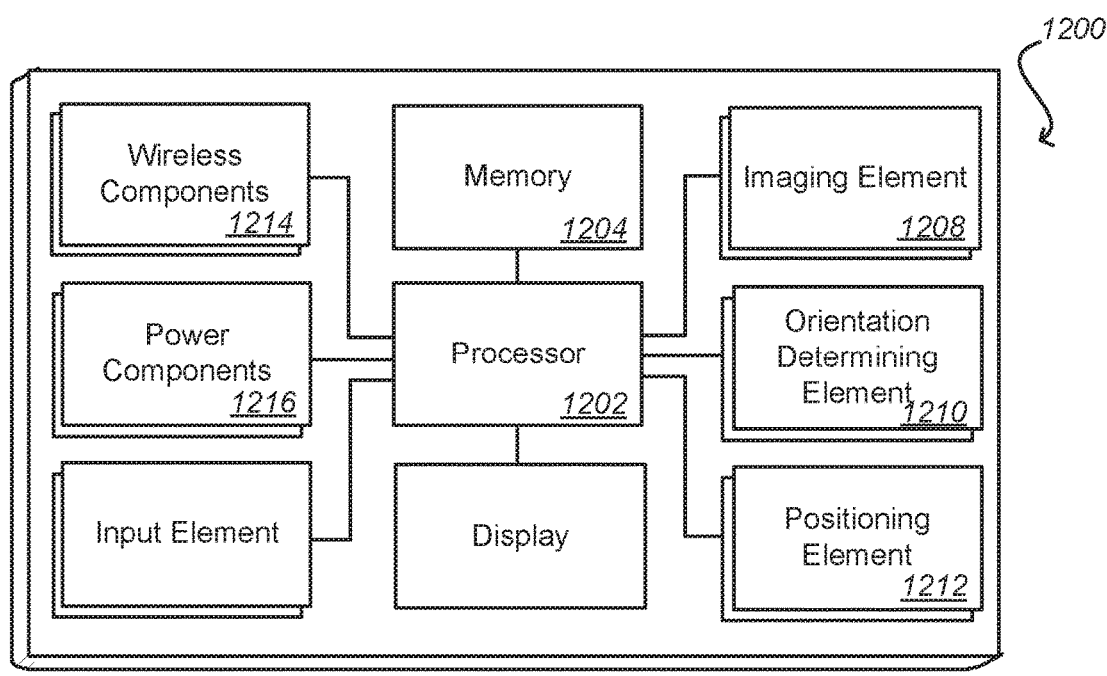
FIG. 12 illustrates a set of example components of one or more devices of the present disclosure in accordance with various embodiments.

FIG. 11 illustrates a set of components of an example computing device 1100 that can be utilized to implement aspects of the various embodiments. FIG. 12 illustrates a set of components of an example computing device 1200 that can be used to implement aspects of various embodiments. The device 1100, 1200 can include at least one processor 1202 for executing instructions that can be stored in a memory device or element 1204. As would be apparent to one of ordinary skill in the art, the device can include many types of memory, data storage or computer-readable media, such as a first data storage for program instructions for execution by the at least one processor 1202, the same or separate storage can be used for images or data, a removable memory can be available for sharing information with other devices, and any number of communication approaches can be available for sharing with other devices. The device may include at least one type of display element 1102, such as a touch screen, electronic ink (e-ink), organic light emitting diode (OLED) or liquid crystal display (LCD), although devices such as servers might convey information via other means, such as through a system of lights and data transmissions. The device typically will include one or more networking components, such as a port, network interface card, or wireless transceiver that enables communication over at least one network. The device can include at least one input device able to receive conventional input from a user. This conventional input can include, for example, a push button, touch pad, touch screen, wheel, joystick, keyboard, mouse, trackball, keypad or any other such device or element whereby a user can input a command to the device. These I/O devices could even be connected by a wireless infrared or Bluetooth or other link as well in some embodiments. In some embodiments, however, such a device might not include any buttons at all and might be controlled only through a combination of visual and audio commands such that a user can control the device without having to be in contact with the device.

The device 1100, 1200 can include one or more imaging elements 1110, 1208. One or more orientation determining elements 1210 can determine the orientation of the device, for example in relation to a user's face or eyes. Various camera-based and other sensors 1104, 1108, 1112, 1118 can be used to determine orientation. A positioning element 1212 can determine the position of the device. The positioning element 1212 can use one or more of GPS, local network detection, Bluetooth connection, or other protocols. One or more input elements 1210 can register user input, for example input received from a touch screen display. An example device 1100, 1200 will also include power components 1216 and wireless components 1214 to communicate with other devices wirelessly.

As discussed, different approaches can be implemented in various environments in accordance with the described embodiments. As will be appreciated, although a Web-based environment is used for purposes of explanation in several examples presented herein, different environments may be used, as appropriate, to implement various embodiments. The system includes an electronic client device, which can include any appropriate device operable to send and receive requests, messages or information over an appropriate network and convey information back to a user of the device. Examples of such client devices include personal computers, cell phones, handheld messaging devices, laptop computers, set-top boxes, personal data assistants, electronic book readers and the like. The network can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled via wired or wireless connections and combinations thereof. In this example, the network includes the Internet, as the environment includes a Web server for receiving requests and serving content in response thereto, although for other networks, an alternative device serving a similar purpose could be used, as would be apparent to one of ordinary skill in the art.

Figure 13:
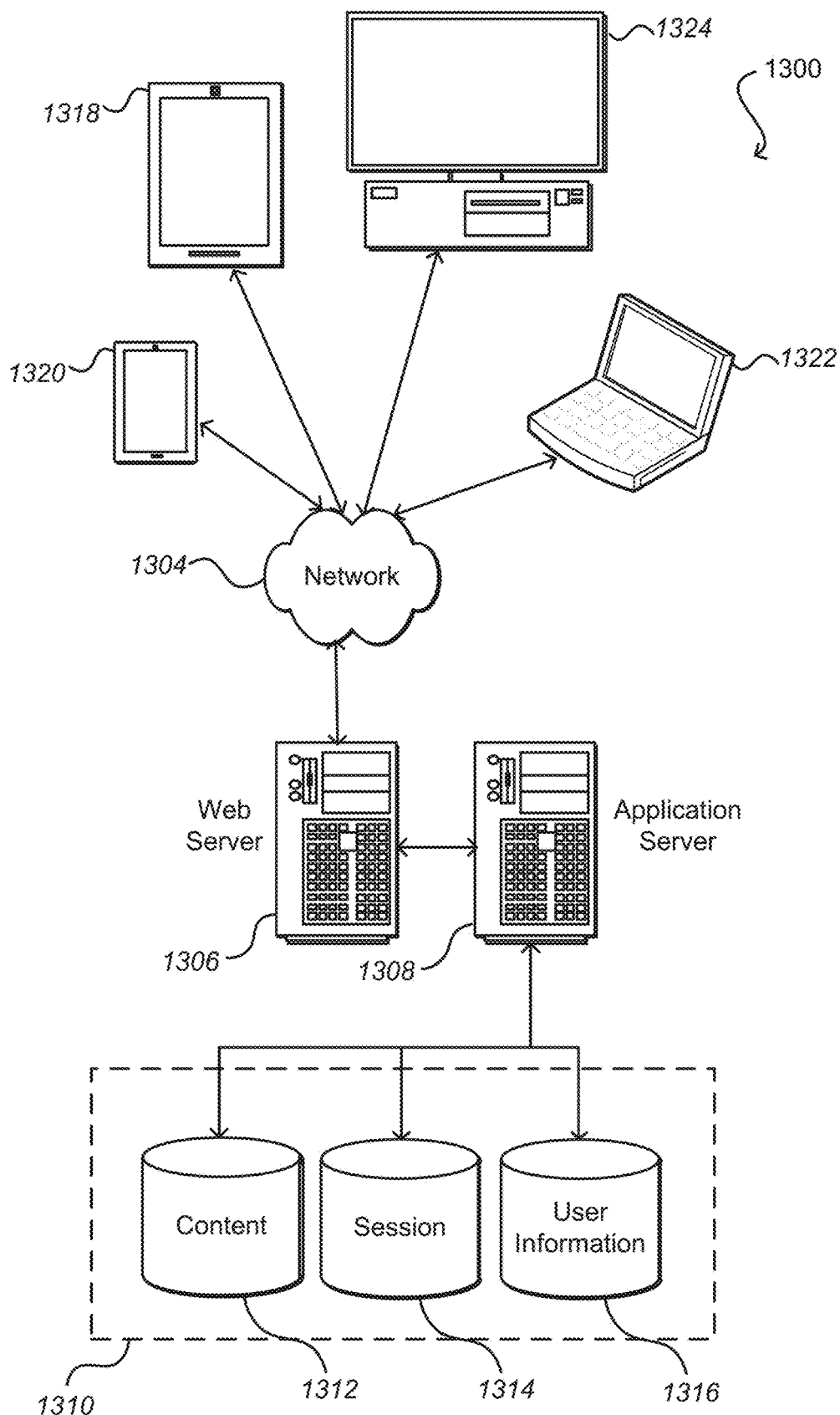
FIG. 13 illustrates an example computing environment that can be used to implement aspects of various embodiments.

FIG. 13 is an example of an illustrative environment 1300 in which embodiments can be implemented. The illustrative environment 1300 includes at least one application server 1308 and a data store 1310. It should be understood that there can be several application servers, layers or other elements, processes or components, which may be chained or otherwise configured, which can interact to perform tasks such as obtaining data from an appropriate data store. As used herein, the term "data store" refers to any device or combination of devices capable of storing, accessing and retrieving data, which may include any combination and number of data servers, databases, data storage devices and data storage media, in any standard, distributed or clustered environment. The application server 1308 can include any appropriate hardware and software for integrating with the data store as needed to execute aspects of one or more applications for the client device and handling a majority of the data access and business logic for an application. The application server 1308 provides access control services in cooperation with the data store and is able to generate content such as text, graphics, audio and/or video to be transferred to the user, which may be served to the user by the Web server in the form of HTML, XML or another appropriate structured language in this example. The handling of all requests and responses, as well as the delivery of content between the client device and the application server, can be handled by the Web server 1306. It should be understood that the Web server 1706 and application servers 1308 are merely example components, as structured code discussed herein can be executed on any appropriate device or host machine as discussed elsewhere herein.

The data store 1310 can include several separate data tables, databases or other data storage mechanisms and media for storing data relating to a particular aspect. For example, the data store 1310 illustrated includes mechanisms for storing content 1312 (e.g., production data) and user information 1316, which can be used to serve content for the production side. The data store is also shown to include a mechanism for storing log or session data 1314. It should be understood that there can be many other aspects that may need to be stored in the data store, such as page image information and access rights information, which can be stored in any of the above listed mechanisms as appropriate or in additional mechanisms in the data store. The data store 1310 is operable, through logic associated therewith, to receive instructions from the application server and obtain, update or otherwise process data in response thereto. In one example, a user might submit a search request for a certain type of item. In this case, the data store 1310 might access the user information to verify the identity of the user and can access the catalog detail information to obtain information about items of that type. The information can then be returned to the user, such as in a results listing on a Web page that the user is able to view via a browser on the user device. Information for a particular item of interest can be viewed in a dedicated page or window of the browser.

Each server 1306, 1308 typically will include an operating system that provides executable program instructions for the general administration and operation of that server and typically will include computer-readable medium storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment 1300 in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated. Thus, the depiction of the systems herein should be taken as being illustrative in nature and not limiting to the scope of the disclosure.

The various embodiments can be further implemented in a wide variety of operating environments, which in some cases can include one or more user computers or computing devices 1318, 1320, 1322, 1324 which can be used to operate any of a number of applications. User or client devices 1318, 1320, 1322, 1324 can include any of a number of general purpose personal computers, such as desktop 1324 or laptop computers 1322 running a standard operating system, as well as cellular, wireless and handheld devices 1318, 1320 running mobile software and capable of supporting a number of networking and messaging protocols. Such a system can also include a number of workstations running any of a variety of commercially-available operating systems and other known applications for purposes such as development and database management. These devices can also include other electronic devices, such as dummy terminals, thin-clients, gaming systems and other devices capable of communicating via a network.

Most embodiments utilize at least one network 1304 that would be familiar to those skilled in the art for supporting communications using any of a variety of commercially-available protocols, such as TCP/IP, FTP, UPnP, NFS, and CIFS. The network 1304 can be, for example, a local area network, a wide-area network, a virtual private network, the Internet, an intranet, an extranet, a public switched telephone network, an infrared network, a wireless network and any combination thereof.

In embodiments utilizing a Web server 1306, the Web server can run any of a variety of server or mid-tier applications, including HTTP servers, FTP servers, CGI servers, data servers, Java servers and business application servers. The server(s) may also be capable of executing programs or scripts in response requests from user devices, such as by executing one or more Web applications that may be implemented as one or more scripts or programs written in any programming language, such as Java®, C, C# or C++ or any scripting language, such as Perl, Python or TCL, as well as combinations thereof. The server(s) may also include database servers, including without limitation those commercially available from Oracle®, Microsoft®, Sybase® and IBM® as well as open-source servers such as MySQL, Postgres, SQLite, MongoDB, and any other server capable of storing, retrieving and accessing structured or unstructured data. Database servers may include table-based servers, document-based servers, unstructured servers, relational servers, non-relational servers or combinations of these and/or other database servers.

The environment 1300 can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch-sensitive display element or keypad) and at least one output device (e.g., a display device, printer or speaker). Such a system may also include one or more storage devices, such as disk drives, magnetic tape drives, optical storage devices and solid-state storage devices such as random access memory (RAM) or read-only memory (ROM), as well as removable media devices, memory cards, flash cards, etc.

Such devices can also include a computer-readable storage media reader, a communications device (e.g., a modem, a network card (wireless or wired), an infrared communication device) and working memory as described above. The computer-readable storage media reader can be connected with, or configured to receive, a computer-readable storage medium representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and other non-transitory computer readable media for containing code, or portions of code, can include any appropriate media known or used in the art, such as but not limited to volatile and non-volatile, removable and non-removable media implemented in any method or technology for storage of information such as computer readable instructions, data structures, program modules or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computer-implemented method, comprising:
   receiving a plurality of object images representing a respective plurality of views of an object;
   creating an object mesh structure based at least in part on the plurality of object images, the object mesh structure representing the object in three dimensions and including a mesh with a plurality of mesh elements;
   determining a first subset of the plurality of views, individual views in the first subset of the plurality of views portraying a set of contiguous portions of the object mesh structure; and
   determining a second subset of the plurality of views, wherein individual views in the second subset of the plurality of views portray a set of mesh elements, and wherein the set of mesh elements comprises elements which form bands around the set of the contiguous portions of the object mesh structure;
   creating a texture atlas, the texture atlas including mapping data to map view data to respective mesh elements of the plurality of mesh elements; and
   providing the texture atlas and the object mesh structure to a client device for display.

2. The computer-implemented method of claim 1, further comprising:
   receiving a request to view a representation of the object;
   displaying, on the client device, the object mesh structure overlaid by view data of the texture atlas.

3. The computer-implemented method of claim 2, further comprising:
   creating a set of texture atlas views, the texture atlas views including views assigned from the first subset of the plurality of views and views assigned from the second subset of the plurality of views, wherein the set of texture atlas views includes mapping data to map the individual texture atlas views to respective mesh elements of the plurality of mesh elements;
   separately providing the set of texture atlas views to the client device; and
   displaying, on the client device, the object mesh structure overlaid by the texture atlas views.

4. The computer-implemented method of claim 3,
   wherein the set of texture atlas views provided contains texture information that differs from information previously displayed on the client device, and
   wherein displaying, on the client device, the object mesh structure overlaid by the texture atlas views includes updating information displayed on the client device.

5. The computer-implemented method of claim 3, wherein at least a portion of the set of mesh elements is generated by eroding a portion of the mesh structure.

6. The computer-implemented method of claim 3, wherein determining, from the plurality of views, a first subset of the plurality of views comprises defining views in the first subset of the plurality of views before the plurality of object images are captured.

7. The computer-implemented method of claim 3, wherein determining, from the plurality of views, a first subset of the plurality of views includes:
   determining one or more planes covering one or more threshold portions of the object mesh structure; and
   determining each view of the first subset of the plurality of views based in part on at least one of the determined one or more planes.

8. A system, comprising:
   at least one processor;
   memory including instructions that, when executed by the at least one processor, cause the system to:
   receive a plurality of object images representing a respective plurality of views of an object;
   create an object mesh structure based at least in part on the plurality of object images, the object mesh structure representing the object in three dimensions and including a mesh with a plurality of mesh elements;
   determine a subset of the plurality of views, individual views in the subset of the plurality of views portraying a set of contiguous portions of the object mesh structure; and
   determine a subset of a plurality of mesh elements, wherein mesh elements in the subset of the plurality of mesh elements form bands around the set of the contiguous portions of the object mesh structure;
   create a texture atlas, the texture atlas including mapping data to map view data to respective mesh elements of the plurality of mesh elements; and
   provide the texture atlas and the object mesh structure to a client device for display.

9. The system of claim 8, wherein the memory further includes instructions that, when executed by the at least one processor, further cause the system to:
   receive a request to view a representation of the object;
   display, on the client device, the object mesh structure overlaid by view data of the texture atlas.

10. The system of claim 9, wherein the memory further includes instructions that, when executed by the at least one processor, further cause the system to:
    create a set of texture atlas views, the texture atlas views including views assigned from the subset of the plurality of views and views portraying at least a portion of the subset of a plurality of mesh elements, wherein the set of texture atlas views includes mapping data to map the individual texture atlas views to respective mesh elements of the plurality of mesh elements;
    separately provide the set of texture atlas views to the client device; and
    display, on the client device, the object mesh structure overlaid by the texture atlas views.

11. The system of claim 10,
    wherein the set of texture atlas views provided contains texture information that differs from information previously displayed on the client device, and
    wherein displaying, on the client device, the object mesh structure overlaid by the texture atlas views includes updating information displayed on the client device.

12. The system of claim 8, wherein at least a portion of the elements in the subset of the plurality of mesh elements are generated by eroding a portion of the mesh structure.

13. The system of claim 8, wherein determining, from the plurality of views, a subset of the plurality of views comprises defining views in the subset of the plurality of views before the plurality of object images are captured.

14. The system of claim 8, wherein determining, from the plurality of views, a subset of the plurality of views includes:
    determining one or more planes covering one or more threshold portions of the object mesh structure; and determining each view of the subset of the plurality of views based in part on at least one of the determined one or more planes.

15. A non-transitory computer-readable storage medium including instructions that, upon execution by a processor of a computing device, cause the computing device to:
receive a plurality of object images representing a respective plurality of views of an object;
create an object mesh structure based at least in part on the plurality of object images, the object mesh structure representing the object in three dimensions and including a mesh with a plurality of mesh elements;
determine a subset of the plurality of views, individual views in the subset of the plurality of views portraying a set of contiguous portions of the object mesh structure;
determine a subset of a plurality of mesh elements, wherein mesh elements in the subset of the plurality of mesh elements form bands around the set of the contiguous portions of the object mesh structure;
create a texture atlas, the texture atlas including mapping data to map view data to respective mesh elements of the plurality of mesh elements; and
provide the texture atlas and the object mesh structure to a client device for display.

16. The non-transitory computer-readable storage medium of claim 15, wherein the instructions that, when executed, further cause the computing device to:
receive a request to view a representation of the object;
display, on the client device, the object mesh structure overlaid by view data of the texture atlas.

17. The non-transitory computer-readable storage medium of claim 16, wherein the instructions that, when executed, further cause the computing device to:
create a set of texture atlas views, the texture atlas views including views assigned from the subset of the plurality of views and views portraying at least a portion of the subset of a plurality of mesh elements, wherein the set of texture atlas views includes mapping data to map the individual texture atlas views to respective mesh elements of the plurality of mesh elements;
separately provide the set of texture atlas views to the client device; and
display, on the client device, the object mesh structure overlaid by the texture atlas views.

18. The non-transitory computer-readable storage medium of claim 17,
wherein the set of texture atlas views provided contains texture information that differs from information previously displayed on the client device, and
wherein displaying, on the client device, the object mesh structure overlaid by the texture atlas views includes updating information displayed on the client device.

19. The non-transitory computer-readable storage medium of claim 15, wherein at least a portion of the elements in the subset of the plurality of mesh elements are generated by eroding a portion of the mesh structure.

20. The non-transitory computer-readable storage medium of claim 15, wherein determining, from the plurality of views, a subset of the plurality of views includes:
determining one or more planes covering one or more threshold portions of the object mesh structure; and
determining each view of the subset of the plurality of views based in part on at least one of the determined one or more planes.

* * * * *